US005517495A

United States Patent [19]
Lund et al.

[11] Patent Number: 5,517,495
[45] Date of Patent: May 14, 1996

[54] FAIR PRIORITIZED SCHEDULING IN AN INPUT-BUFFERED SWITCH

[75] Inventors: Carsten Lund, New Providence, N.J.; Steven Phillips, New York, N.Y.; Nicholas F. Reingold, Madison, N.J.

[73] Assignee: AT&T Corp., Murray Hill, N.J.

[21] Appl. No.: 350,347

[22] Filed: Dec. 6, 1994

[51] Int. Cl.⁶ .................................. H04L 12/56
[52] U.S. Cl. ............................ 370/60; 370/85.6
[58] Field of Search .................. 370/60, 60.1, 85.6, 370/94.1, 94.2, 61

[56] References Cited

U.S. PATENT DOCUMENTS

| | | | |
|---|---|---|---|
| 5,166,926 | 11/1992 | Cisneros et al. | 370/94.1 |
| 5,255,265 | 10/1993 | Eng et al. | 370/60 |
| 5,287,182 | 2/1994 | Haskell et al. | 348/500 |
| 5,325,356 | 6/1994 | Lyles | 370/60 |

OTHER PUBLICATIONS

T. E. Anderson et al., "High–Speed Scheduling for Local–Area Networks", ACM Trans. on Computer Systems, vol. 11, No. 4, Nov. 1993, pp. 319–352.
M. J. Karol et al., "Input Versus Output Queueing on a Space–Division Packet Switch", IEEE Trans. on Comm., vol. COM–35, No. 12, 1987, pp. 1347–1356.
N. McKeown et al., "Scheduling Cells in an Input–Queued Switch", Electronics Lett., Dec. 1993, pp. 1–4.
H. Obara et al., "An Efficient Contention Resolution Algorithm for Input Queueing ATM Cross–Connect Switches", Int'l. J. of Digital and Analog Cabled Systems, vol. 2, 1989, pp. 261–267.

*Primary Examiner*—Melvin Marcelo

[57] ABSTRACT

A Fair Arbitrated Round Robin (FARR) method is disclosed for scheduling the crossbar of an input-buffered asynchronous transfer mode (ATM) switch using an arbiter. Per-virtual-circuit queuing of ATM cells is performed.

23 Claims, 11 Drawing Sheets

FAIR PRIORITIZED SCHEDULING IN AN INPUT-BUFFERED SWITCH

BACKGROUND OF THE INVENTION

1. Field of the Invention

This disclosure relates to fixed size packet switches, such as asynchronous transfer mode (ATM) switches, and in particular to an apparatus and method for scheduling cell inputs through ATM switches.

2. Description of the Related Art

Advances in high-speed cell-based communications have been prompted by a number of factors, including increased traffic on the "Information Superhighway", the high bandwidth requirements of video-on-demand, the convergence of technology trends enabling high-speed communications, such as laser-optic technology, and the progress of ATM communications which makes possible the unification of the transmission of voice, video, and data in a common technology.

ATM offers uniformity of network protocols with respect to both cell content (voice, data, etc.) and network scale. Standardized cell formats in ATM support voice traffic in large commercial telephone networks and simplify the design of switches for smaller networks.

Using round robin scheduling, an output-buffered switch may run at multi-gigabit speeds but is prohibitively expensive to implement. Generally, fair prioritized round robin (PRR) scheduling provides fair resolution when there is conflict for resources. Such PRR scheduling has been discussed in, for example, E. L. Hahne, "Round Robin Scheduling for Fair Flow Control in Data Communication Networks", LABORATORY FOR INFORMATION AND DECISION SYSTEMS, Mass. Inst. Tech., Cambridge, Mass. 02139.

For input buffered switches, methods such as bandwidth reservation and static scheduling have been implemented to provide cell scheduling. Another scheduling method, Iterative Round Robin Matching with Slip, is discussed in McKeown et al., "Scheduling Cells in an Input-Queued Switch," ELECTRONICS LETTERS, December 1993. Another scheduling method is Parallel Iterative Matching (PIM) discussed in T. E. Anderson et al., "High-Speed Switch Scheduling for Local-Area Networks," ACM TRANS. ON COMPUTER SYSTEMS, 11(4):319–352, 1993. PIM switch scheduling methods allocating bandwidth fairly among the links may be very unfair in allocating bandwidth between virtual circuits.

SUMMARY

An input-buffered ATM switch is disclosed with novel switch scheduling method which is suitable for fast low cost local to wide area networks. The ATM switch includes a plurality of input buffers for receiving the arriving cells, each input buffer associated with a respective input port; a cell switching fabric for processing the received cells from the input buffers to the output ports; and a scheduling control circuit for controlling the processing of the received cells through the cell switching fabric using a fair arbitration round robin (FARR) program. Each input buffer includes a service list associated with each priority level for each output port; and a plurality of cell queues, one per virtual circuit that enters the switch at that input and having an associated timestamp; and the scheduling control circuit uses the timestamps to generate a matching of input buffers to output ports to control the processing of the received cells.

A method is also disclosed for switching arriving cells using FARR in an input-buffered ATM switch from input ports having associated input buffers to output ports. The method includes the steps of receiving cells in the input buffers; in each input buffer, pre-selecting a virtual circuit for each output port; performing request processing to send the timestamp of each pre-selected virtual circuit to a scheduling control circuit; generating a matching of the input buffers to the output ports from the scheduling control circuit using the timestamps; and for each pair in the matching, sending a cell of the virtual circuit corresponding to that pair through a cell switching fabric and setting the timestamp of each virtual circuit corresponding to a pair in the matching.

The step of matching includes the step of using an arbiter unit operating a FARR program. The step of generating a matching includes the steps of, for each unmatched output port, granting the request for it having minimum timestamp; for each unmatched input buffer, accepting the granted request with minimum timestamp; and incorporating the accepted grants in the matching. In addition, the method includes the steps of granting requests, accepting grants, and incorporating the accepted grants are performed for a predetermined number of rounds.

The switch scheduling by FARR respects cell priorities, enables voice and video cells to be transmitted with very small delay, and allows the remaining bandwidth to be used by data cells with less rigorous timing constraints. Contention between virtual circuits within the same priority level is resolved fairly. Each input link has a random access cell buffer and a buffer manager for header translation, addressing, and management of service lists.

The disclosed FARR method performs input-buffered switch scheduling with improved performance over other input-buffered switch scheduling methods such as SLIP, PIM, etc.

BRIEF DESCRIPTION OF THE DRAWINGS

The features of the disclosed input-buffered switch and fair arbitrated round robin scheduling method will become more readily apparent and may be better understood by referring to the following detailed description of an illustrative embodiment of the present invention, taken in conjunction with the accompanying drawings, where.

DESCRIPTION OF THE PREFERRED EMBODIMENTS

Figure 1:
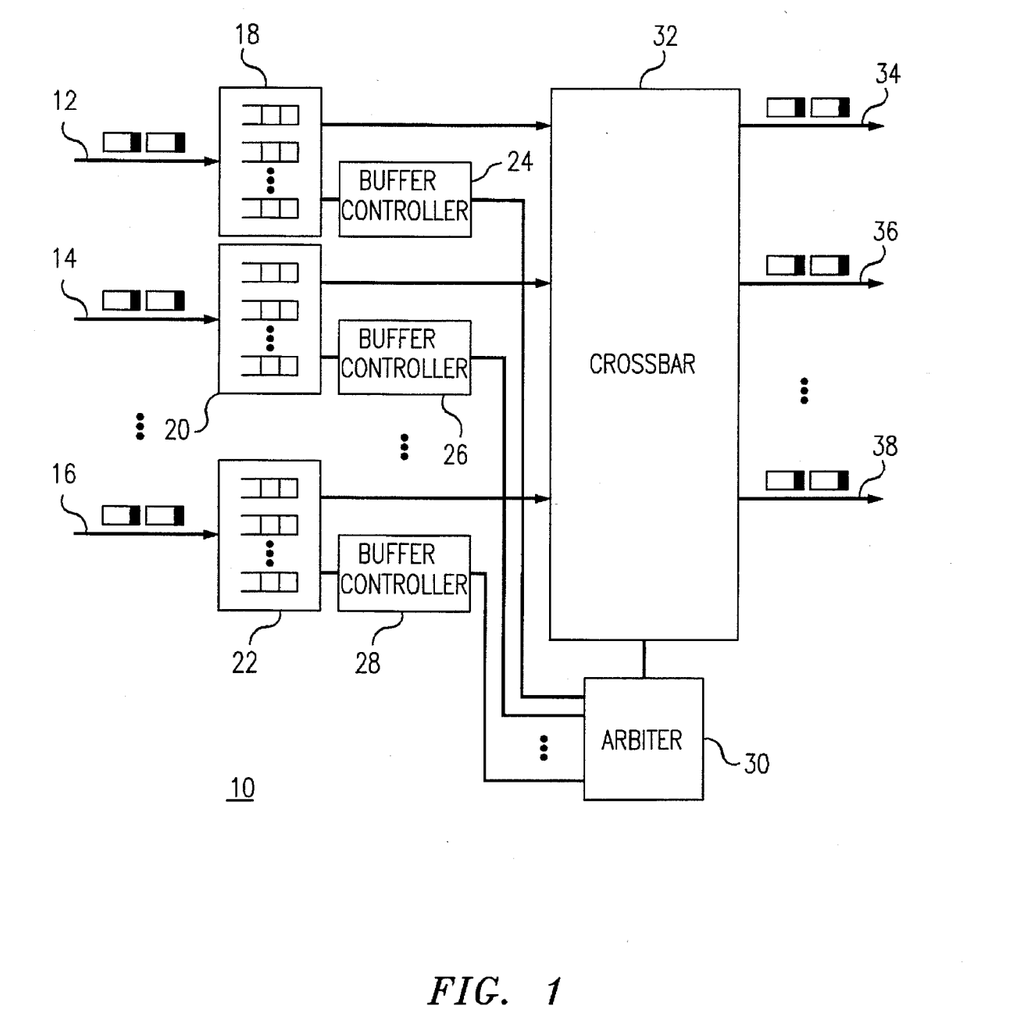
FIG. 1 illustrates an input-buffered switch.

Referring now in specific detail to the drawings, with like reference numerals identifying similar or identical elements, as shown in FIG. 1, the present disclosure describes an input-buffered ATM switch 10 implementing a Fair Arbitrated Round Robin (FARR) cell scheduling method for switching ATM cells. Each input link 12–16 is respectively associated with one of the random access cell input buffers 18–22 and one of the buffer controllers 24–28 for header translation, addressing, and management of service lists.

An exemplary cell input buffer 18 is the DATAPATH chip available from AT&T Corp., which has a bandwidth of 1.2 Gbits/second and multiplexes/demultiplexes at rates around 155 Mbits/second. The arbiter chip 30 implementing FARR can be constructed, for example, using cell array technology, such as AT&T's HL400C CMOS Standard Cell family. A set of commercially available crossbar chips form the crossbar 32 as the cell switch fabric connected to outputs 34–38. In the exemplary embodiment, an 8×8 switch is provided with link speeds of 1.2 Gbits/second. It is understood that larger capacity switches such as a 32×32 switch may be implemented in accordance with the present disclosure. Faster buffers permit the switch 10 to be scaled to a link speed of 2.4 Gbits/second and beyond.

In alternative embodiments, the addition of a DATAPATH cell buffer to each output allows the 8×8 switch to be used in a 64×64 configuration, with link speeds of 155 Mbits/second. Such a switch is applicable to many high-speed local area network applications. For large networks, switches may be combined in an arbitrary-topology network, with gigabit/second links between switches. Such a network offers much greater aggregate bandwidth than linear networks such as Ethernet, such as discussed in R. Metcalfe et al., "Ethernet: Distributed Packet Switching for Local Computer Networks", COMM. OF THE ACM, 7:395–404, July 1976.

The disclosed FARR scheduling method is implemented in an input-buffered switch to perform in a manner similar to PRR, where available bandwidth is shared fairly between different virtual circuits (VC) at the same priority level. Thus fairness is inherent in the disclosed scheduling system and method.

INPUT BUFFERING AND MATCHING

For some input-queued switches, head-of-line blocking reduces the performance of the cell processing. For example, if FIFO queues are used at the inputs, then the queues saturate at a utilization value approaching $2-2^{1/2}= 0.586$ for large switches.

Output-queued switches using a switch memory fabric and output buffers operate at N times a link speed in an N×N switch, causing such output-queued switches to become prohibitively expensive at high link speeds. An input-queued switch is less expensive to operate since the switch fabric, such as a crossbar or Batcher-banyan network, is required to operate at the link speed.

As shown in FIG. 1 to implement input-queued switching, random access cell buffers 18–22 are provided at the inputs 12–16 for performing buffering referred to as input-buffering, as discussed in T. E. Anderson et al., cited above.

As disclosed herein, the input-buffer system and method provides fast and effective scheduling of cell processing at the crossbar 32 using a centralized arbiter 30. In the exemplary embodiment, the arbiter 30 processes fixed-size ATM cells, se the crossbar 32 may operate synchronously. For each cell time, the arbiter 30 selects a set of cells to enter the crossbar 32. Each cell resides in a different input buffer, and each cell is destined for a different output, so the arbiter 30 repeatedly solves a bipartite matching problem. The arbiter 30 finds a large match in each step, which provides good fairness properties. In the context of ATM, it is desirable to have per-VC fairness, where available bandwidth is shared among contending virtual circuits and where all virtual circuits with the same bandwidth and priority level experience similar maximum cell delays. In addition, cells of high priority have precedence over lower priority cells.

Figure 2:
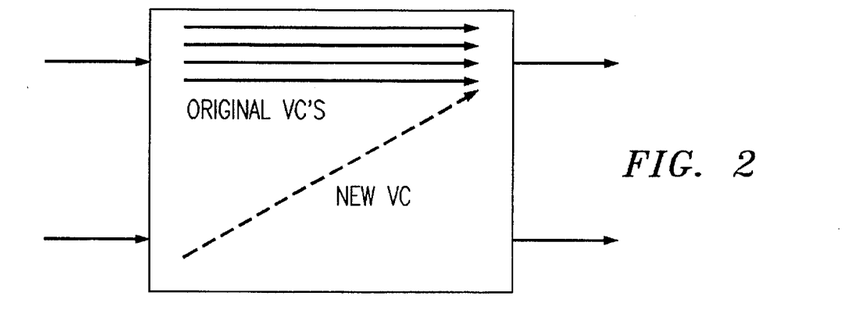
FIGS. 2–4 are graphical illustrations of fairness of per-virtual-circuits.
Figure 3:
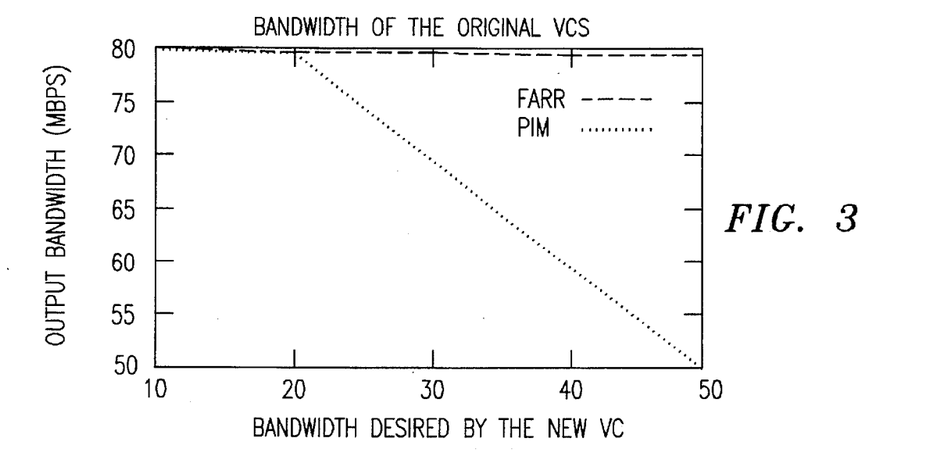
Figure 4:
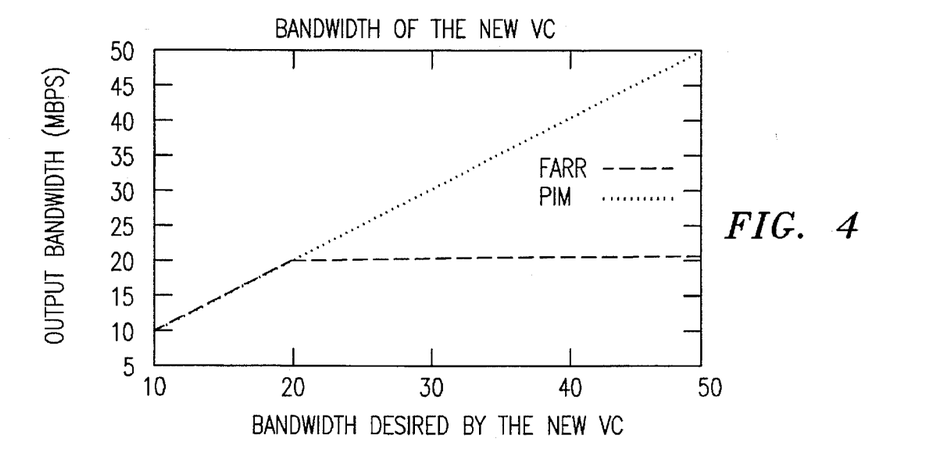

In the disclosed ATM switch, per-virtual circuit fairness is implemented using the FARR method disclosed herein. For example, referring to FIGS. 2–4, for a 2×2 switch having 100 Mbit links and 4 virtual circuits running from INPUT1 to OUTPUT1, each using 20 Mbits/second of bandwidth, the introduction of a new virtual circuit from INPUT2 to OUTPUT1 shown in FIG. 2, with a desired bandwidth varying between 10 Mbits/second and 50 Mbit/second has an effect on the bandwidth of the original circuits as shown in FIGS. 3–4. For the exemplary switch using FARR having per-VC fairness, the bandwidth to the new circuit is limited to 20 Mbits/second, so bandwidth allocation is fair.

THE FARR SCHEDULING METHOD

In the disclosed scheduling method, a matching of inputs to outputs is determined in each cell time, describing the set of cells which is to traverse the crossbar. For the disclosed input-buffered switch, the disclosed FARR method implements the performance of PRR for output-buffered switches such as the PRR implementations cited above.

In the exemplary embodiment, each of input buffers 18–22 maintains a service list for each priority level for each output 34–38, and each VC in a service list has a timestamp which indicates the time when that VC last sent a cell across the crossbar 32. The extended timestamp of a VC is its timestamp prepended with its priority. The priority of a virtual circuit is fixed and represents the traffic class. Such priority values may be set as 0 for voice traffic, 1 for video traffic, and 2 for data traffic.

Figure 5:
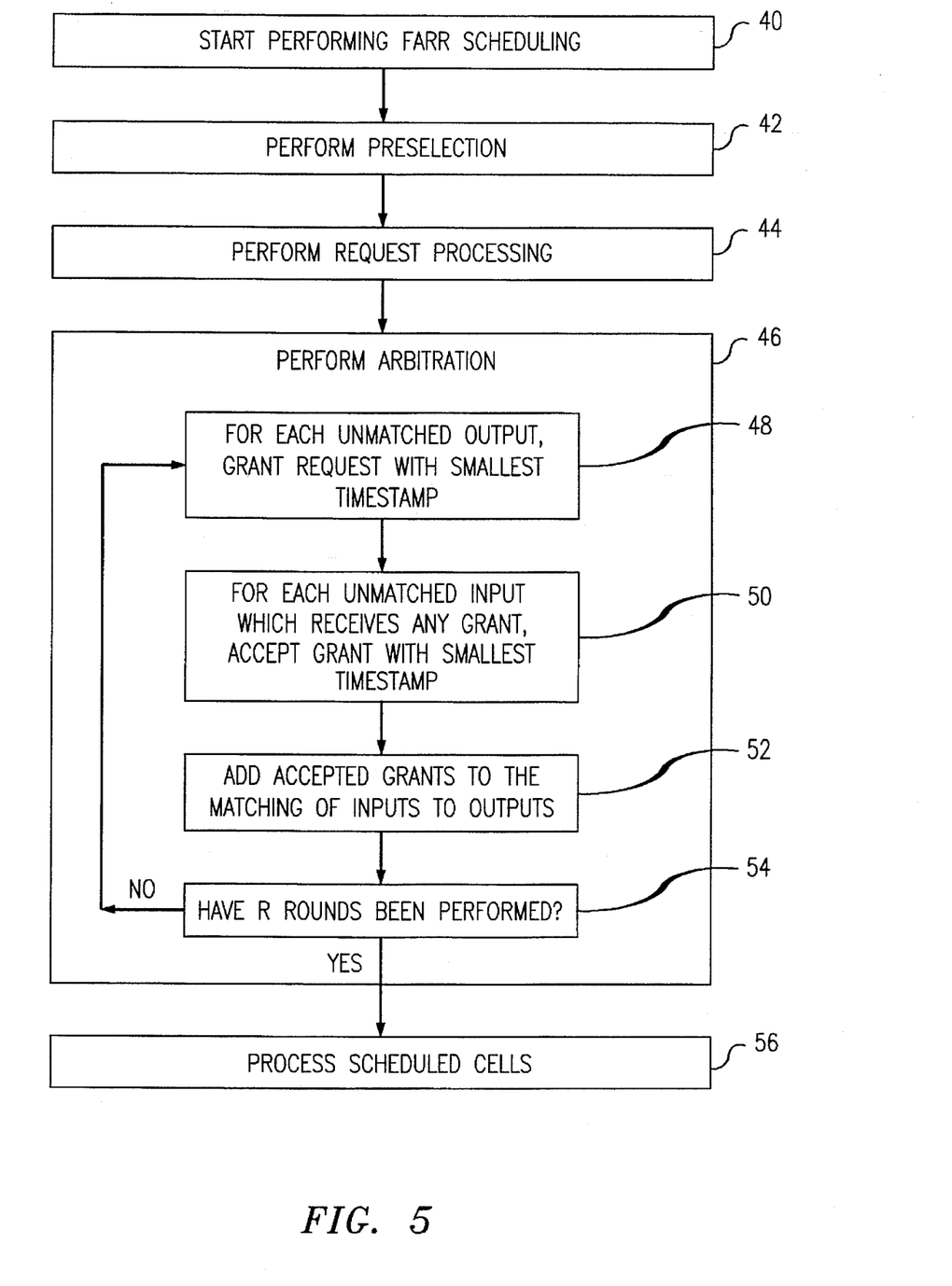
FIG. 5 is a flowchart of the disclosed method of FARR scheduling.

As shown in FIG. 5, the FARR method for the disclosed input-buffered switch 10 includes the steps of starting the FARR scheduling method in step 40, performing preselection at the input buffers in step 42, performing request processing in step 44, and using the arbiter 30 to perform arbitration in step 46 as follows:

1. in performing preselection in step 42, each input preselects the VC at the head of the highest priority non-empty service list for each output for which the output has buffered cells;

2. in the processing of requests in step 44, each input sends the extended timestamp of each preselected VC to the arbiter 30; and 3. in the performing arbitration in step 46, the following steps 48–52 are repeated R times until R rounds have been completed in step 54:
    (a) for each unmatched output, if it has any request from unmatched inputs, FARR method grants the request with smallest extended timestamp in step 48;
    (b) for each unmatched input, if it receives any grants, the FARR method accepts the grant with smallest extended timestamp in step 50; and
    (c) any accepted grants are added to the matching in step 52.

Upon completing the arbitration in step 46 to obtain a matching of inputs to outputs, the FARR method processes the matching in step 56 by sending the oldest cell of each virtual circuit in the matching to traverse the crossbar 32.

When a VC is inserted at the end of a service list, because the VC has sent a cell or because a cell arrived and the VC was not yet in the service list, the timestamp is set to the global time. The global time is provided by a counter that is incremented on each cell time, using a timestamp management method such as those disclosed below. The FARR method preserves the order of cells in a virtual circuit. In an alternative embodiment, each virtual circuit is timestamped with the current time whenever it has a cell sent across the crossbar 32.

The number of rounds R of matching is flexible, and is to be maximized within the timing and cost constraints of the input-buffered switch. When no more pairs may be added to the matching, i.e. a maximal matching has been found, no further rounds are necessary. In the exemplary embodiment, R=4. In alternative embodiment, using R=3 rounds is comparable to continuing until a maximal matching is found.

In FIG. 5, the processing of requests in step 44 has the transfer of N extended timestamps for each cell time from each input to the arbiter 30. The timestamp is stored in the arbiter 30, and at most two extended timestamps are sent from each input. The first extended timestamp replaces the extended timestamp of the virtual circuit of a cell that was sent in the last cell time, and the second extended timestamp is that of the virtual circuit of a cell that may have arrived into an empty service list.

In alternative embodiments, first-in-first-out (FIFO) scheduling for voice traffic in the input buffer controllers may be implemented by the FARR method, where the timestamps are associated with entries in a FIFO queue record the time that each cell has arrived. Thus the FARR method performs FIFO queuing across the input buffers at the voice priority level, while providing round-robin service at other priority levels.

In the FARR method disclosed in FIG. 5, the steps 48–50 in the step 46 of arbitration 46 involve selecting a request from a set of contending requests, by picking the request with smallest extended timestamp. Such a selection may be performed using a tree of comparators. Alternatively, each contending request is connected to a shared connection wire for performing an AND function. In step 48, each contending request places the high order bit of their value on the connection wire, so the connection wire has a logic value of 0 exactly when there is a contending request with a high bit of 0. Thus all contending requests that have the high bit set to logic 1 may drop out of the contention.

In step 50 of FIG. 5 the remaining contending requests compete based on their second highest bit, and then on their third highest bit, etc. The number of rounds is the number of bits of resolution in the timestamps, which requires that the extended timestamps being compared be distinct.

Long timestamps require a large amount of storage space in the arbiter 30 and buffer controllers 24–28, and thus slow down the arbitration process in step 46 of FIG. 5. It is preferable to keep the timestamps short, while avoiding wrap-around, since a short timestamp may wrap around frequently in the timestamp counter. In the exemplary embodiment, wrap-around of the timestamp counter is performed as follows: when the global time wraps around, the counter shifts all timestamps right by a single 1 bit, and sets the high-order bit of the global time to 1.

This counter wrap-around method provides that the order of the timestamps is the same as the order of last service of the queues. However, it does require the timestamps to all of the queues be adjusted periodically; for example, once in 512 cell times for 10-bit timestamps. An advantage of this method is that it provides extra bits of timestamp resolution, since only the low order bits are lost when shifting. For example, FARR distinguishes between a VC that has not received service for three global time wraparounds from a VC that has not received service in four global time wraparounds.

An alternative embodiment of the disclosed timestamp management method avoids changing all timestamps simultaneously by keeping longer timestamps in the input buffer controllers 24–28, which are long enough such that wraparound does not occur. The long timestamps may be translated into shorter timestamps before being sent to the arbiter 30, and suitably right-shifted for old timestamps.

A second alternative method that does not require the timestamps to be adjusted after they have been set is the following: let C be a cell with timestamp t, at the head of a service list, and let $t_G$ be the global time. Before using t in the contention process, if the high bit of $t_G$ is 0, flip the high bit of t.

As long as no cell waits in a service list for more than $2^k$, where $k=|t_G|-1$ cell times this method provides that the order of the timestamps of contending virtual circuits is exactly the order in which the inputs last sent cells. Therefore the number of bits in the global counter and the timestamps are to be large enough so that the timestamps cycle through each service list in at most $2^k$ cell times.

A third alternative method is to use an "age" value rather than an actual timestamp. The age of a VC is set to 0 when the VC is inserted at the end of the service list, and is incremented once per cell time. This third alternative method does not employ a global time and hence avoids global time wraparound. Age values are to be kept in the active memory, in which all ages are incremented in parallel.

Alternative exemplary embodiments provide advantages by varying the crossbar speed, such as by running the crossbar switch 32 in FIG. 1 faster than the link speeds. A crossbar switch that runs somewhat faster than the link speed is generally less expensive to implement than an output queued switch. Significant performance improvement is achieved by running the crossbar 10% to 20% faster than the link speed. If the crossbar speed is increased, buffering at the crossbar outputs 34–38 is to be included. In an exemplary embodiment, about 5 cells per link suffices. A 10% crossbar speedup is sufficient for the performance of the disclosed FARR method to be very close to that of PRR.

If the crossbar 32 runs faster than link speed, then the input buffers 18–22 are to be drained faster than link speed. However, this buffer speedup may be avoided by the following exemplary method: for a crossbar 32 running 10% faster than the input buffers 18–22, step 48 in FIG. 5 may be modified to set an input to be ineligible if the input has sent a cell for each of the last 9 time steps. If a 2-cell buffer is then maintained at each input to the crossbar 32, and have cells delayed between 0 and 1 cell times in this 2-cell buffer, then each cell is guaranteed to have arrived from the input buffer by the time the crossbar 32 is to send it.

The disclosed switch 10 implementing FARR may perform in a pipelined manner since the following three steps of the implementation are essentially independent for adjacent cell times and similar in time complexity:

1. contention resolution is performed to determine the set of cells to be sent;
2. the crossbar is set up to send the cells; and
3. the crossbar transmits the cells.

Step (2) above requires most of a cell time, since commercial crossbar chips generally allow only one path to be determined per clock cycle, so the N paths of an N×N crossbar is to be set up in sequence. The crossbar 32 may be programmed in step (2) above while the previous set of cells are being transmitted in step (3) above, since crossbar chips typically have double-buffered control.

SCALING OF THE INPUT-BUFFERED SWITCH

For the input-buffered switch 10 using FARR, scaling may be implemented using the following exemplary specifications:

1. BUFFERS

An ATM cell buffer implementing the input buffers 18–22 is organized in 424 bit words. The throughput of the buffer is limited by the cycle time of the memory array. For DRAM technology with a cycle time of 100 ns, the throughput of each buffer is about 2.1 Gbits/second, while for SRAM technology with a cycle time of 30 ns the maximum buffer throughput increases to 7.1 Gbits/second.

2. BUFFER CONTROLLERS

The buffer controllers 24–28 keep service lists, perform header translation and address lookup, and manage storage in the buffer. The DATAPATH controller available from AT&T Corp. keeps the service lists in 25 ns SRAM, and performs the pointer manipulation in about 200 ns, well within the 350 ns available at 1.2 Gbits/second. Currently available faster SRAM would easily permit the buffer controllers to manage a 2.4 Gbits/second buffer.

3. CROSSBAR

The size of the crossbar 32 is limited by pin count and wiring constraints. Currently available fast crossbars are available for 32×32 and 64×64 configurations.

4. ARBITRATION

The size of the arbiter 30 is determined by the pins necessary to receive extended timestamps from the buffer controllers. If each extended timestamp is 10 bits long and is passed in a two cycles (or three cycles when the output port number is sent for a newly arrived cell), then 160 pins are required for a 32×32 switch. The same number of pins may be required to return the results of arbitration to the buffer controllers, so a 400 pin package generally suffices. For timing, R=4 rounds of FARR requires 8 steps in sequence, where each step includes finding the maximum of a subset of a row (or column) in the timestamp matrix. Thus at 2.4 Gbits/second there is at most 20 ns available per step. Calculations based on gate delays may be implemented in 0.5 micron CMOS technology. In addition, the arbiter 30 needs to store $n^2$ timestamps. For a 32×32 switch with 10 bit timestamps, this amounts to 10 Kbits of storage, which is attainable.

Thus with currently available CMOS technology, the total throughput of the disclosed input-buffered switch running FARR is around 80 Gbits/second.

EMPIRICAL EVALUATION

To determine the performance of the disclosed switch 10 implementing FARR, evaluations were performed to compare FARR with the PIM, SLIP, and PRR methods. The SLIP and PIM methods behaved very similarly under evaluation, so the comparisons below refer primarily to PIM, with the understanding that such comparisons apply to SLIP. PRR is evaluated as well since the performance of PRR is to be achieved by FARR to attain output-queued performance in an input-buffered switch.

The following sections present the results of simulating FARR, PIM, and PRR under a variety of work loads, traffic types and switch sizes. In the evaluations a 16×16 switch is used with link speeds of 155 megabits per second.

WORKLOAD MODELING

The performance of the disclosed input-buffered switch 10 implementing FARR is evaluated for different traffic types, voice, video and data. In such evaluations, a voice source generates constant bit rate traffic at a rate of 64 Kbits per second, while a video source generates Poisson traffic at a rate of 1 Mbit per second. As a data source, a cell train model is used in which bursts of cells are interspersed with large gaps. The length of a burst is a geometric random variable with a mean of 12, while the inter-burst gap is chosen uniformly up to some limit, where the limit is such that the average bandwidth is 1 Mbit per second.

The evaluations are performed on a single ATM switch 10, with the input for this switch 10 generated by setting up a large number of virtual channels. In the evaluations, the input link and the output link for each VC is chosen at random among all the links, subject to the condition that the VC does not enter and leave the same link, and does not increase the bandwidth through any incoming or outgoing link above 95%. Virtual channels are added until the average link load reaches a threshold percentage P. The parameter P, a measure of the switch utilization, is varied in most of the evaluations to determine the behavior of the algorithms under varying switch loads.

Figure 6:
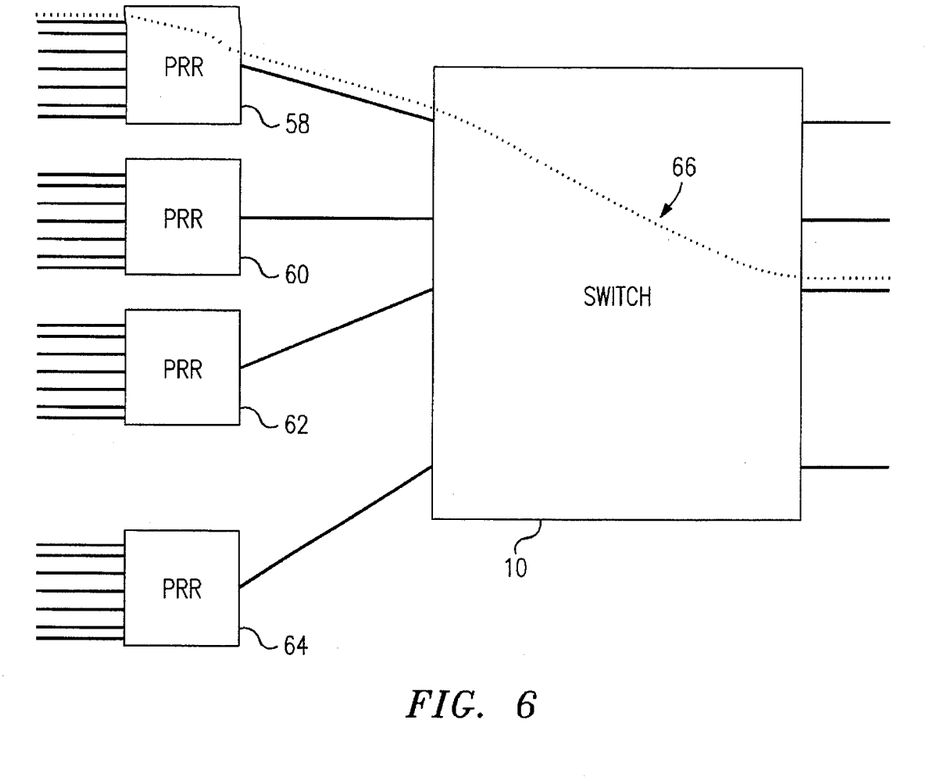
FIG. 6 illustrates a workload model.

Because different virtual channels feeding into the same input may produce cells at the same time, these virtual channels are multiplexed. In a real network this multiplexing is done by earlier switches in the network. In the evaluations PRR schedulers 58–64 are positioned between each input and the VC's feeding into a switch 10 such as VC 66, as shown in FIG. 6. The PRR schedulers 58–64 simulate the interleaving of channels by earlier switches in a real network.

In measuring cell delays in the switch 10, delays inside the PRR schedulers 58–64 at the inputs are not included, since the delay induced by the switch scheduling method inside a switch 10 is to be evaluated.

In addition to the three basic traffic types, one evaluation involves adding a file transfer after the other virtual channels have been set up. A file transfer source uses the same cell train distribution as a data source, but absorbs all the available bandwidth. Its bandwidth is thus the minimum of the remaining bandwidth on the input and output links it uses. The four traffic types are summarized in TABLE 1.

TABLE 1

| | Priority | Bandwidth | Distribution |
|---|---|---|---|
| Voice | 0 | 64,000 | Constant Bit Rate |
| Video | 1 | 1,000,000 | Poisson |
| Data | 2 | 1,000,000 | Cell Train |
| File Transfer | 2 | All Available | Poisson |

The workload models are derived by selecting a set of virtual channels each with one of the above traffic source types, using the following models:

vvd The basic workload model employed, with 10% voice, 40% video and 50% data traffic.

server A model with non-uniform work load, which may arise in a client-server environment. The first 4 input and output links are connected to servers, while the remaining links are connected to clients. The load on client-client connections is only 10% of the load on server-server or server-client connections. This is implemented by first constructing an instance of the vvd model, then randomly dropping 90% of the client-client virtual channels.

video A model with 100% Video traffic. This is close to a standard uniform link load model.

ft After constructing an instance of the vvd model, an additional VC of type File Transfer is added with enough bandwidth to saturate some switch link.

EVALUATIONS

In the evaluations for the above models, the workload model, the switch scheduling method, the switch size, and the utilization parameter P are varied. In each evaluation, the average and maximum queue sizes are measured as well as the average and maximum delay of each traffic type. Each evaluation is run for a 20,000 cell times in order to overcome any initial transient effects. To obtain as much statistical significance as possible, each evaluation is run 50 times. Whenever the average of a parameter is measured; for example, for the delay on voice cells, the average over all cells in all runs is indicated. Similarly, the maximum value of a parameter indicated is the maximum over all cells in all runs.

By running the evaluations many times over, values are obtained that are representative of all configurations of virtual channels, rather than just a single configuration. In the evaluations presented below, whenever the model is not mentioned it should be understood to be vvd model. Similarly the default switch size is 16×16, and the switch size is indicated when deviating from the default. A logarithmic scale is used when presenting average or maximum queuing delays or queue sizes.

PER-VC FAIRNESS

Figure 7:
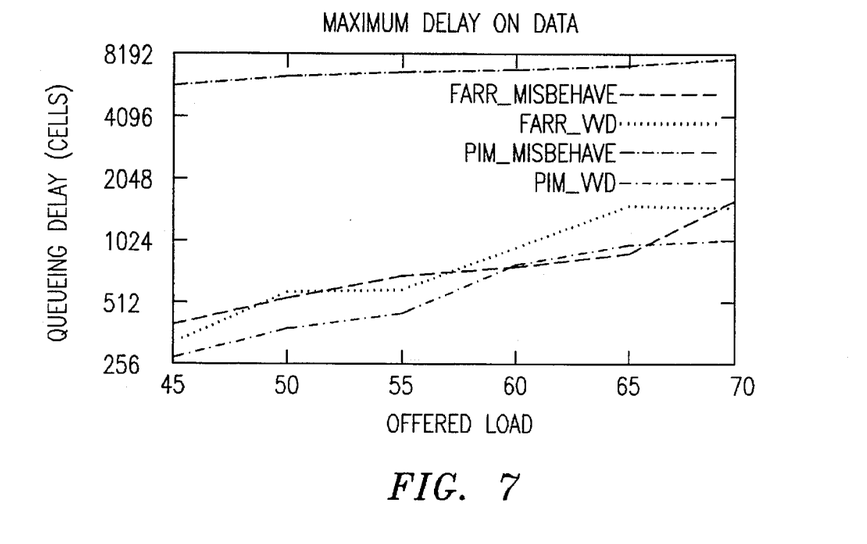
FIGS. 7–24 illustrate workload evaluation results for the FARR scheduling method and comparable scheduling methods.

As shown in FIG. 7, the evaluation shown studies the effect that high-bandwidth virtual channels have on lower bandwidth channels. In FIG. 7 the FARR and PIM methods and the vvd and ft workload models are shown. A difference between the workload models is that ft includes a single file transfer channel that is added after forming a vvd configuration of virtual channels. FIG. 7 shows the average delay on data cells from channels other than the file transfer for PIM and FARR.

When average delays are compared in the vvd model, the file transfer has almost no effect on the maximum queuing delay of other data cells if FARR is used as the switch scheduling method, which demonstrates that FARR insulates virtual channels from the behavior of other virtual channels, as is the case for PRR.

However, the file transfer causes PIM to greatly increase the queuing delay of some data cells in previously existing virtual channels. This is true also of other scheduling algorithms for input-buffered switches, such as SLIP.

PRIORITIES FOR DIFFERENT TRAFFIC TYPES

Figure 8:
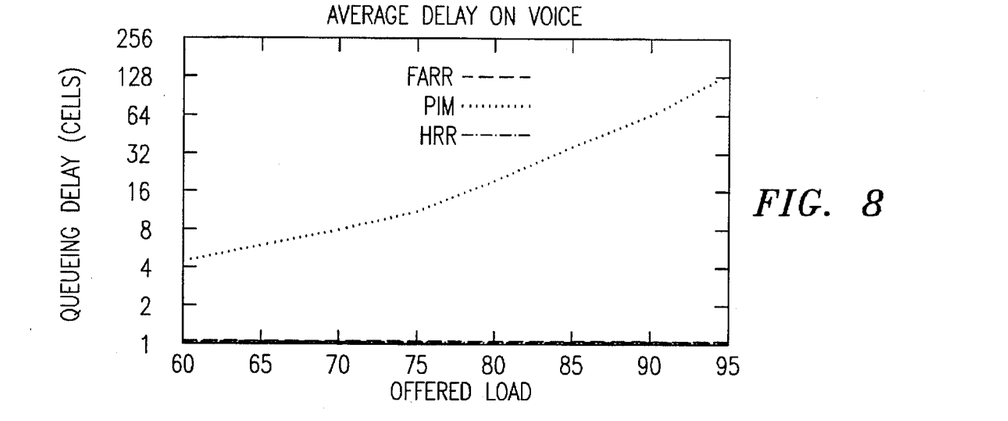
Figure 9:
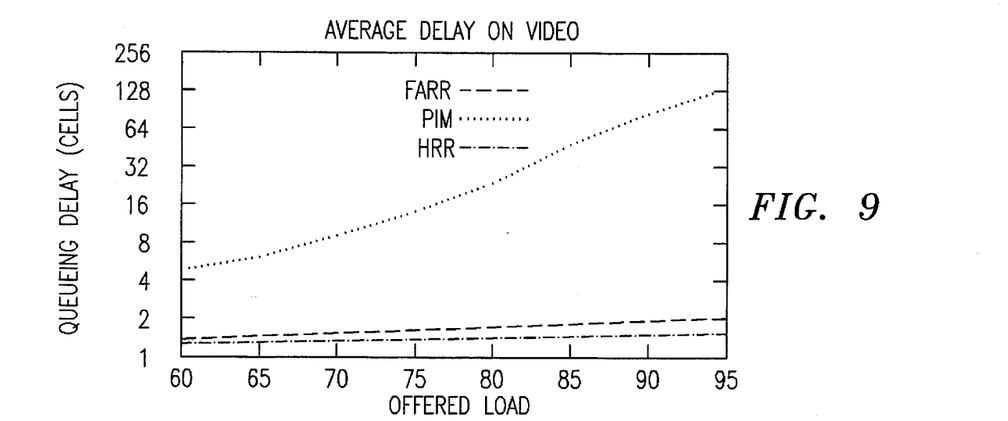
Figure 10:
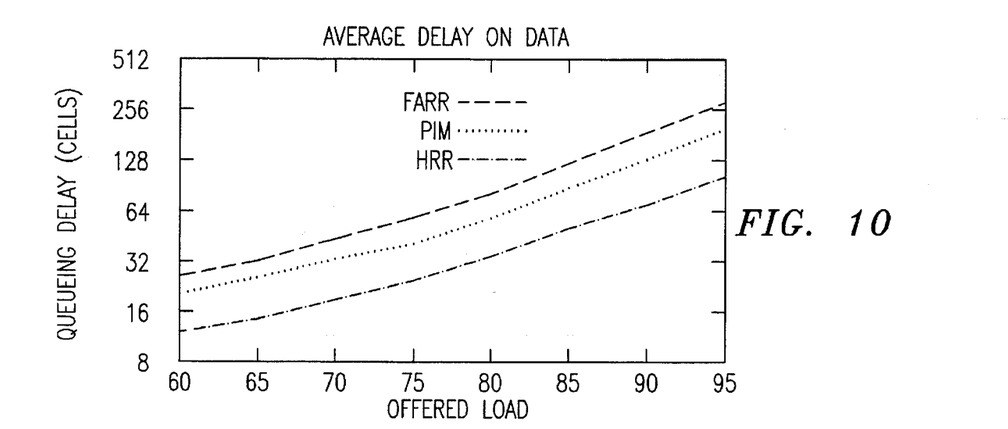

As shown in FIGS. 8–10, a evaluation is shown illustrating the importance of using multiple priority levels in an ATM switch. Both FARR and PRR respect cell priorities, and therefore have much smaller average queuing delay for voice and video cells than for data cells. In contrast, PIM does not use multiple priority levels, so voice and video cells are subject to large delays under high traffic loads. In addition, PIM has consistently smaller queuing delays than FARR on data traffic. However, this is unavoidable, since FARR is delaying data cells to make way for cells of higher priorities.

UNEVEN TRAFFIC LOADS

Figure 11:
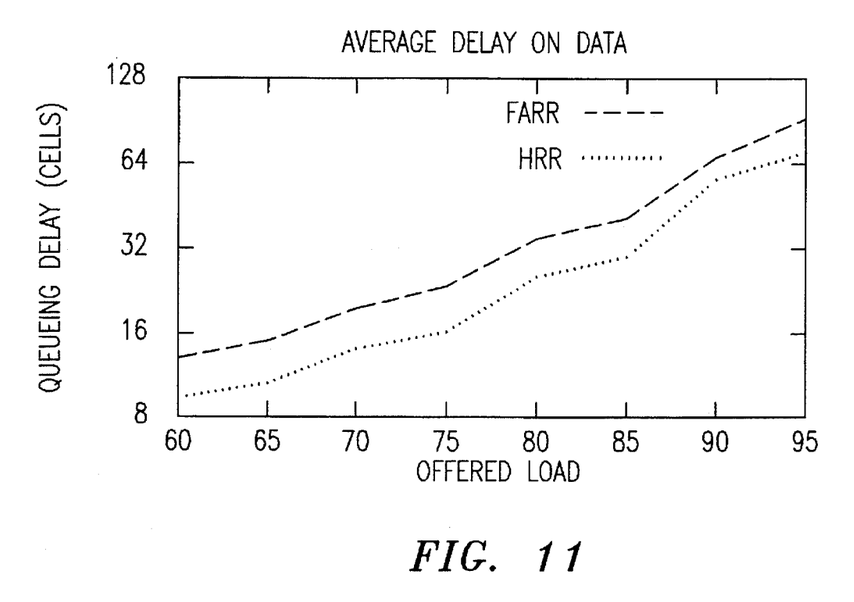
Figure 12:
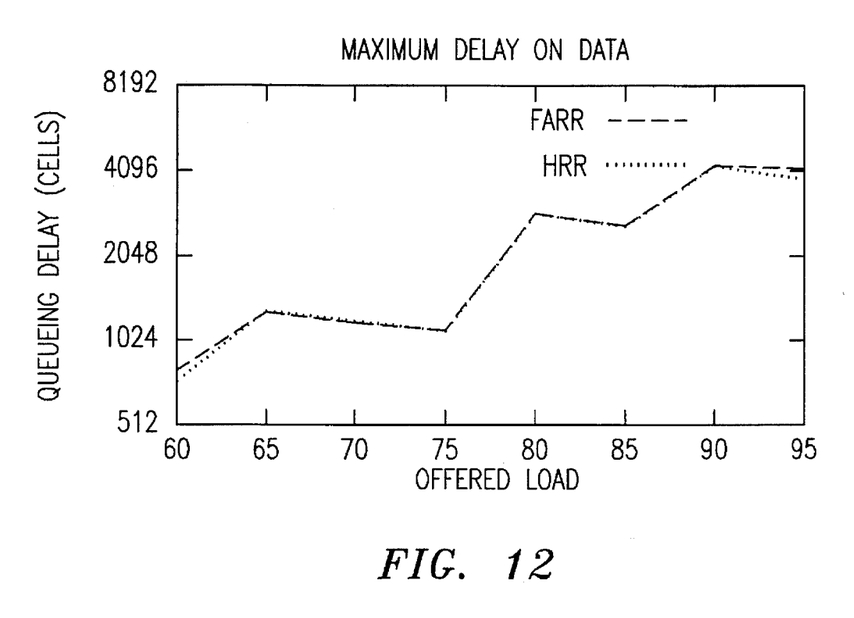

It is possible for a switch scheduling method to perform well on uniform traffic loads, but not on the imbalanced traffic loads that frequently arise in real networks. To evaluate FARR on an unevenly distributed traffic load, the server workload model is used including a switch with connections to 4 servers and 12 clients. Traffic from clients to clients is reduced to only 10% of the other traffic types. In this model, FARR exhibits very similar performance to PRR. In FIGS. 11–12 the average and maximum delay on data cells is presented, and other cell types yield similar results.

INPUT BUFFERING MAY YIELD SMALLER MAXIMUM QUEUE SIZE

Figure 13:
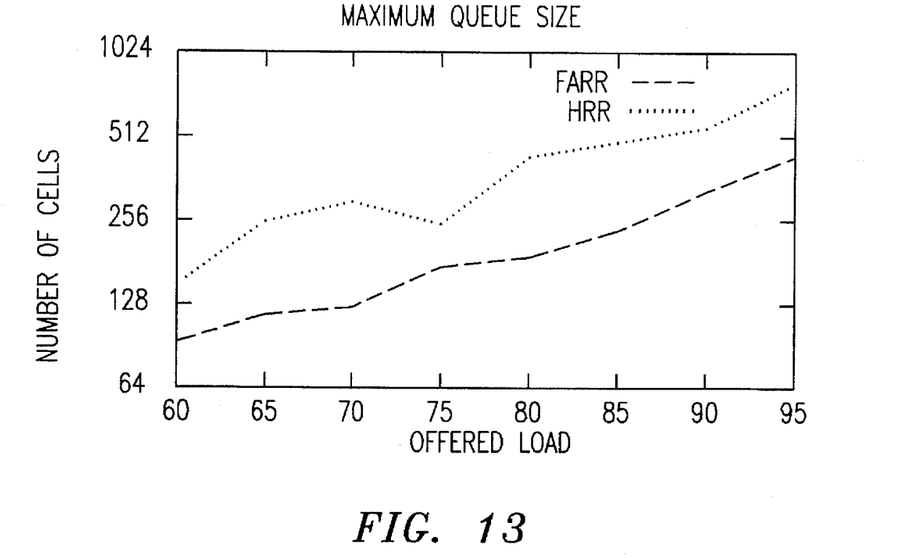
Figure 14:
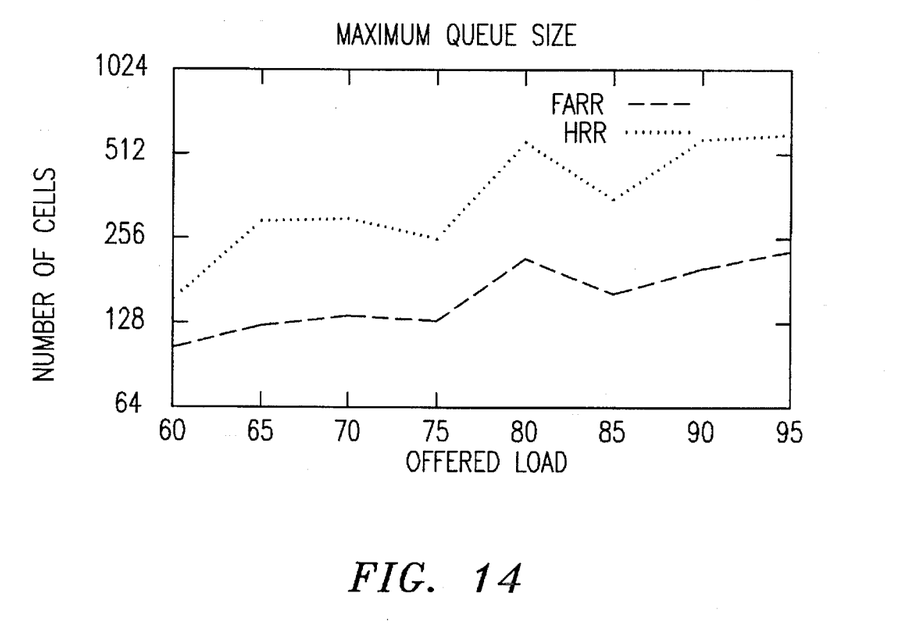

As shown in FIGS. 13–14, the maximum queue size is an important measure of a switch scheduling method because a scheduling method that has a larger maximum queue size requires larger buffers to avoid dropping cells. In the case that cell loss is tolerable at low levels, the maximum queue size is an indication of the buffer size needed to achieve a low enough level of cell loss probability.

In many of the evaluations, the maximum queue size for input-buffered switches is smaller than that of an output-buffered switch; i.e. a switch with a separate buffer at each output link, since there is "hot spot" contention at an output link in an output-buffered switch. The cells building up in that buffer are being received from a number inputs. In an input-buffered switch, those cells remain at the inputs, and each input buffer holds a smaller number of cells than the output buffer at the overload link.

FIGS. 13–14 show that the maximum queue for FARR is significantly less for FARR than for PRR under two workload models with the vvd model shown in FIG. 13 and the server model shown in FIG. 14.

For a particular workload, if the bottleneck of an input-buffered switch is the switch fabric, rather than an output link, then output-buffering may achieve smaller maximum queue size for that workload.

SCALING WITH SWITCH SIZE

In an N×N switch, output-buffering requires the switch fabric to run at N times the link speed, while input-buffering avoids this speed-up. The advantage of input-buffering increases with larger N, so it is important to determine how well an input-buffered switch schedule scales with increasing N.

Figure 15:
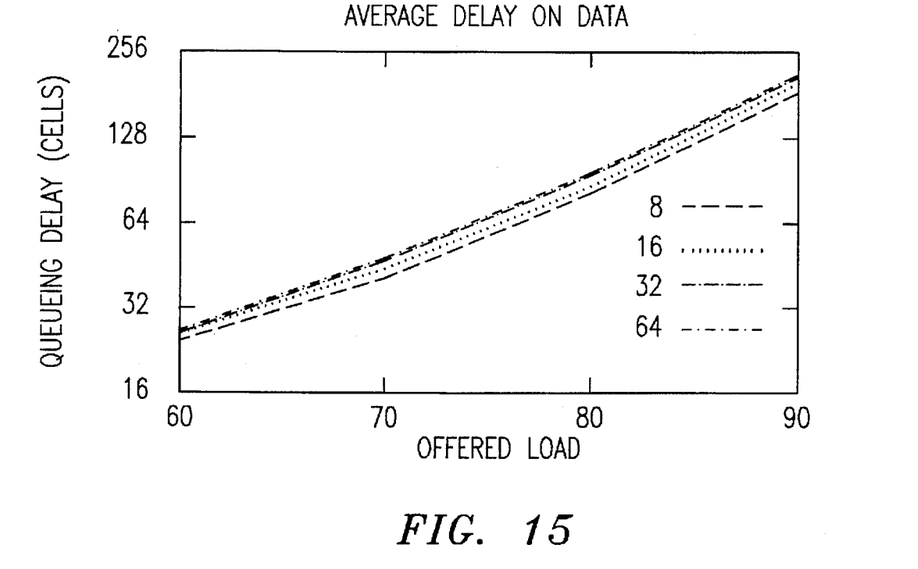
Figure 16:
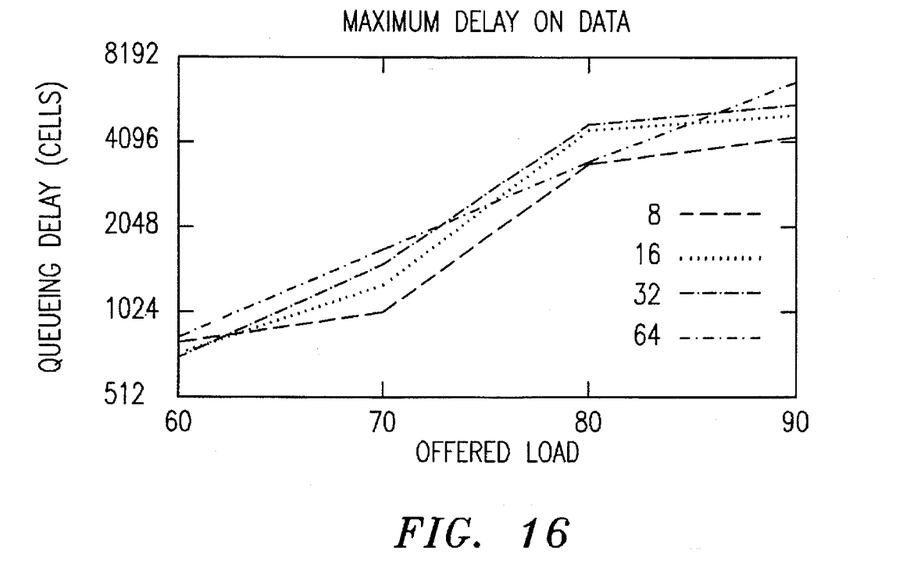

FIGS. 15–16 indicate how FARR scales to larger switch sizes, where the average delay of data cells remains constant across different switch sizes, while the maximum delay increases slightly for larger switches.

In a 64×64 switch the maximum delay of a data cell is roughly twice the maximum delay in an 8×8 switch. This correlates to the fact that the evaluation of the 64×64 switch involved 8 times as many cells. When the 8×8 switch is simulated for 8 times as long, the maximum delay observed rose by a factor of 2, so FARR scales well to large switches.

CROSSBAR SPEEDUP

Depending on the relative price of the components of an input-buffered ATM switch, it may be cost-effective to run the crossbar faster than the incoming and outgoing links, giving the switch the advantage of being able to transfer data from inputs to outputs faster than link speed without resorting to a fabric running at N times link speed as in an output-queued switch.

Figure 17:
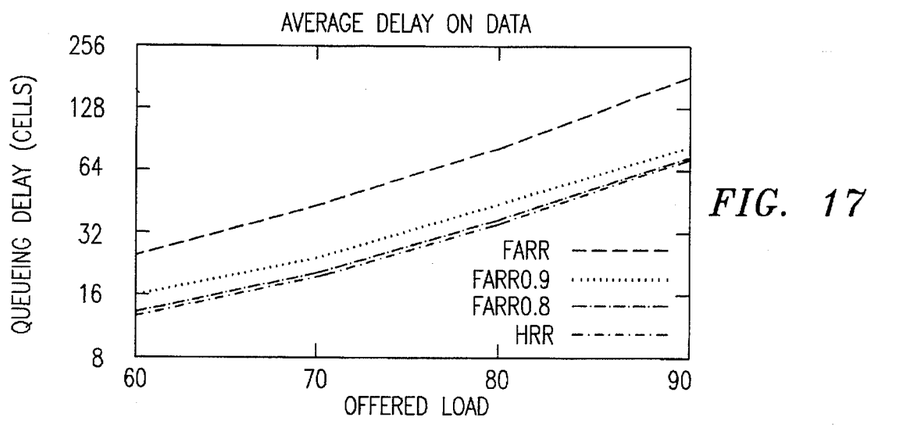

The evaluations show that a crossbar speedup of 10% provides a distinct improvement in the performance of FARR, while a speedup of 20% gives performance which is extremely close to that of PRR. For example, FIG. 17 shows that a crossbar speedup of 10% decreases the average cell delay for data channels by almost a factor of 2 under the vvd workload model, while a 20% speedup gives average delay equal to that of PRR.

NUMBER OF ROUNDS NEEDED BY FARR

Figure 18:
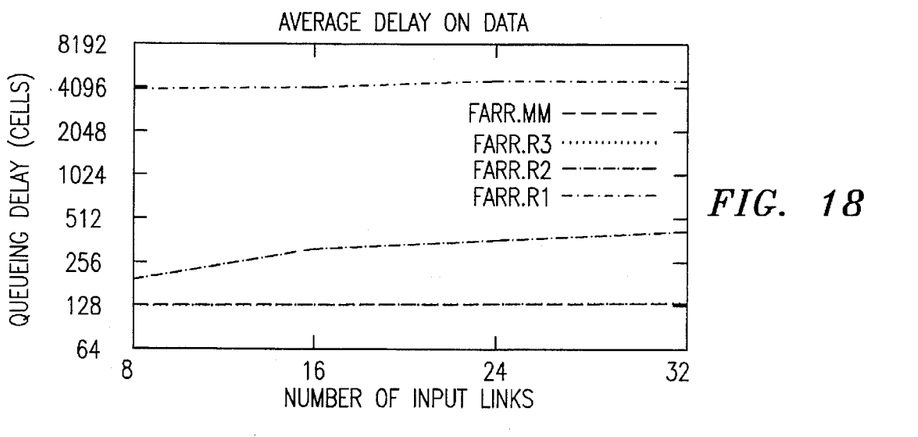
Figure 19:
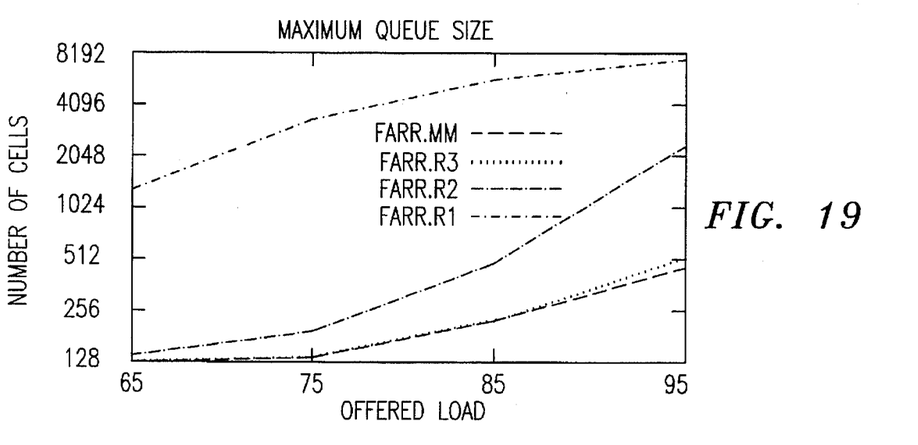

The evaluation shown in FIGS. 18–19 investigates the effect of varying R, the number of rounds used by FARR. To maximize switch throughput, it may be required that R be large enough that FARR always finds a maximal matching; i.e. a matching that cannot be extended by the addition of any more pairs. On the other hand, if the link speed is 1 Gigabit per second, there are only 424 nanoseconds available for FARR to choose a matching. For fewer rounds R that FARR uses, FARR is easier to implement.

FIGS. 18–19 show the average delay on data cells and the maximum queue size, respectively, for varying numbers of rounds. The line FARR.mm corresponds to continuing FARR for as many rounds as are needed to produce a maximal matching. As shown in FIGS. 18–19, one round is inadequate, and three rounds provides a substantial improvement for over two rounds. With three rounds the performance is very close to FARR.mm. The evaluations show four rounds to be indistinguishable from FARR.mm. FIGS. 18–19 illustrate that these observations are valid across a range of switch sizes, so 3 rounds of contention suffice. In a preferred embodiment, 4 rounds provides the best mode for operation of FARR.

PERFORMANCE ON POISSON TRAFFIC

Figure 20:
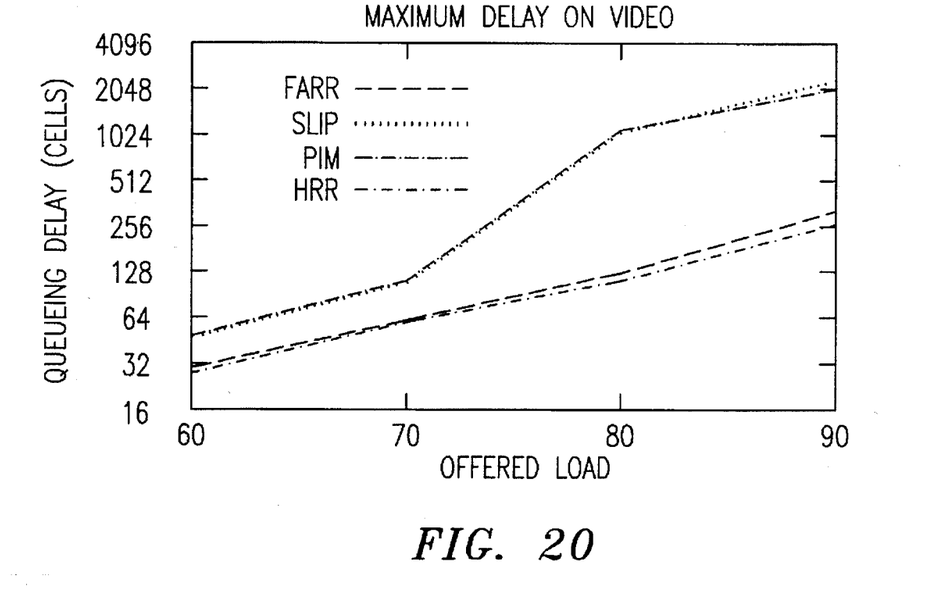
Figure 21:
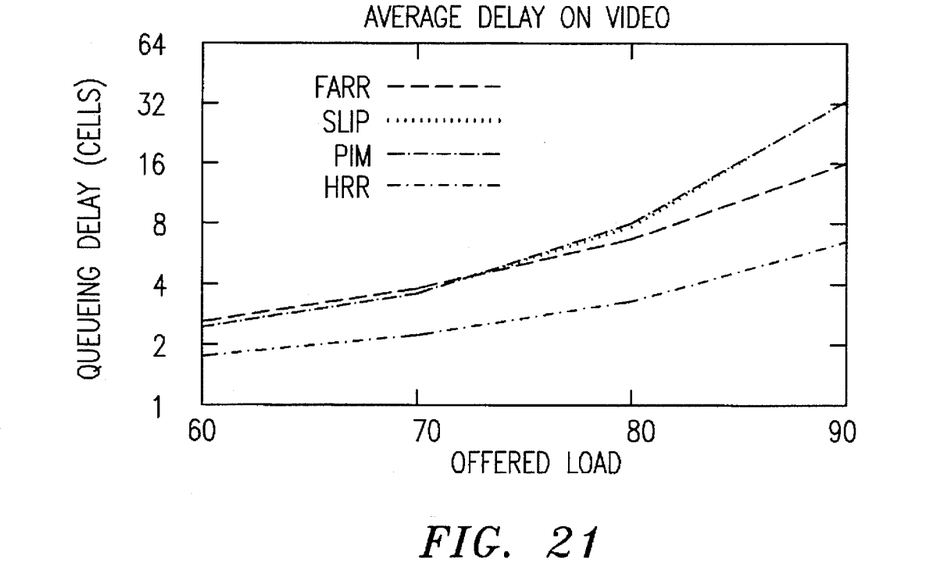

In the evaluations shown in FIGS. 20–21, the performance of FARR compared to PIM, SLIP and PRR on the video workload model are illustrated. This model consists of setting up video conversations until the average load on the input (or output) links reaches a threshold of P. This is based on presenting data derived from this source since this source is quite close to the uniform Poisson workload model, which has often been used to analyze the performance of switch methods.

FIG. 20 shows that FARR simulates PRR very closely but PIM and SLIP both have maximum cell delays of up to a factor of 8 larger, since different inputs have different numbers of video channels. Methods such as SLIP and PIM that do not exhibit per-channel fairness create large cell delays on the more loaded inputs.

FIG. 21 shows that FARR, PIM and SLIP achieve the same average cell delay up to a threshold of about 80%.

INFLUENCE OF HIGH PRIORITY TRAFFIC ON LOW PRIORITY TRAFFIC

Figure 22:
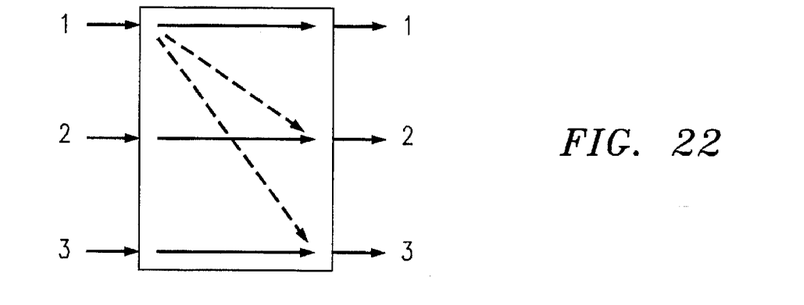
Figure 23:
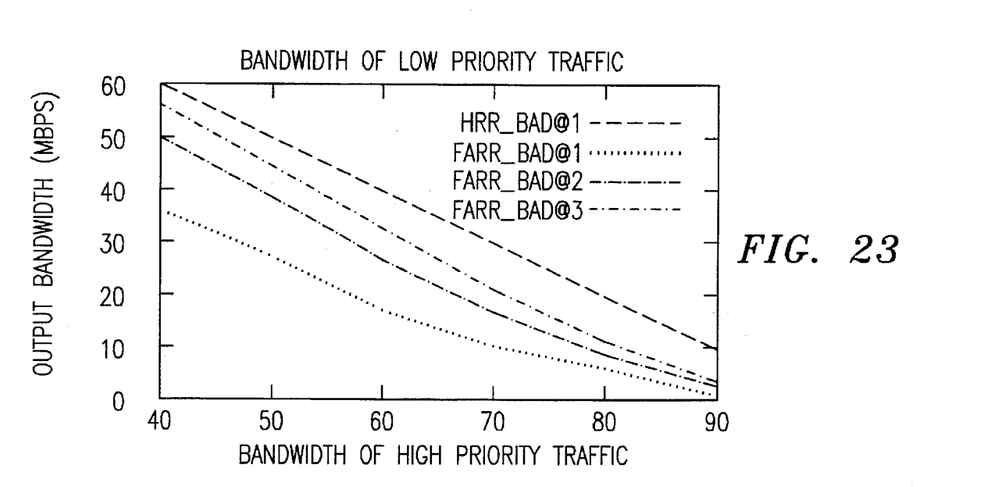
Figure 24:
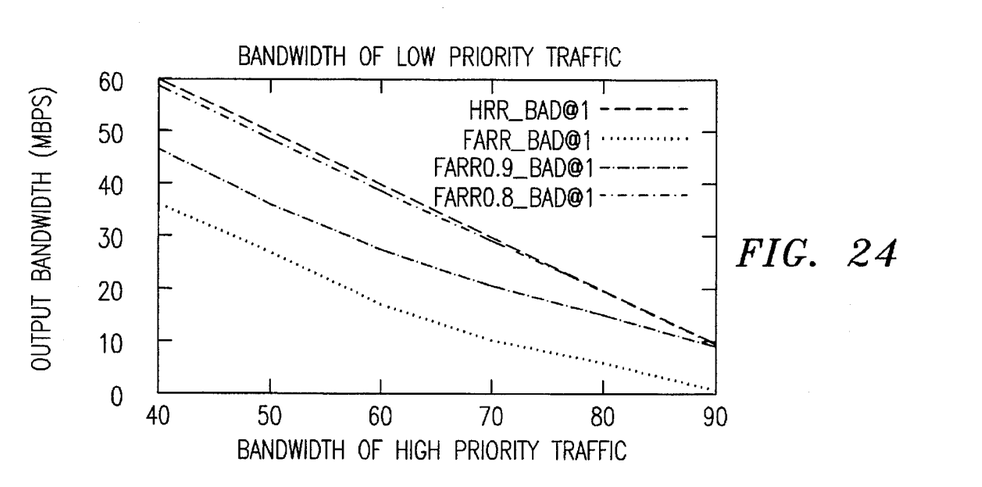

FIGS. 22–24 show worst case behavior of FARR involving low priority traffic being slowed down by large bandwidth higher priority traffic, using an N×N switch shown in FIG. 22 in which each input i is sending a fraction P of the link bandwidth straight across to output i. In addition, INPUT1 has low priority traffic to send to outputs 2, 3, . . . , K+1. This traffic pattern is depicted in FIG. 13.

For the amount of bandwidth given to the low priority traffic, FIG. 23 shows that when K=1, the low priority bandwidth is substantially lower than that achieved by PRR. However, this effect decreases fast as K increases, since PRR has the low priority bandwidth of (1-P) times the link bandwidth. On the other hand, for FARR, the fraction of time that INPUT1 has no high priority cells waiting to send is (1-P), and the fraction of time that one of outputs 2, 3, . . . , K+1 has no high priority cell waiting to be sent to it is $(1-P^K)$. Thus the probability that INPUT1 is able to send a low priority cell is $(1-P)(1-P^K)$ FIG. 24 illustrated the effect of crossbar speedup for the worst case of this phenomenon, when K=1. A speedup of 10% returns half of the lost low priority bandwidth, while a speedup of 20% is indistinguishable from PRR.

While the disclosed input-buffered switch and FARR scheduling method has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. An apparatus for scheduling input buffers of fixed size packet switches, including asynchronous transfer mode (ATM) switches, having input and output ports, the apparatus comprising:

a plurality of input buffers having associate virtual circuits for receiving the arriving cells, each input buffer associated with a respective input port;

a cell switching fabric for processing the received cells from the input buffers to the output ports; and a scheduling control circuit which uses timestamps associated with the virtual circuits for controlling the processing of the received cells through the cell switching fabric using fair arbitration round robin (FARR) to allow each virtual circuit to receive a fair share of bandwidth.

2. An apparatus for scheduling input buffers of fixed size packet switches, including asynchronous transfer mode (ATM) switches, having input ad output ports, the apparatus comprising:

a plurality of input buffers for receiving arriving cells, each input buffer is associated with a respective input port and includes a service list associated with each priority level for each output port;

a cell switching fabric for processing the received cells from the input buffers to the output ports;

a plurality of queues, each queue associated with a virtual circuit connecting the input buffer with at least one output port and having an associated timestamp; and a scheduling control circuit which uses the timestamps to generate a matching of input buffers to output ports to control the processing of the received cells through the cell switching fabric using a fair arbitration round robin (FARR) program.

3. A method for scheduling input buffers of fixed size packet switches, including asynchronous transfer mode (ATM) switches, having input and output ports, the method comprising the steps of:

receiving cells in the input buffers;

pre-selecting at each input buffer a virtual circuit for each output port;

performing request processing to send a timestamp associated with each pre-selected virtual circuit to a scheduling control circuit;

generating a matching of the input buffers to the output ports from the scheduling control circuit using the timestamps; and processing the received cells through a cell switching fabric to the output ports using the matching.

4. The method of claim 3 wherein the step of matching includes the step of using an arbiter unit operating a fair arbitration round robin (FARR) program.

5. The method of claim 3 wherein the step of generating a matching includes the steps of:

granting, for each unmatched output port, the request having a minimum timestamp;

accepting, for each unmatched input buffer, the granted request with a minimum timestamp; and incorporating the accepted granted request in the matching.

6. The method of claim 5 wherein the steps of granting requests, accepting granted requests, and incorporating the accepted granted requests are performed for a predetermined number of rounds.

7. The method of claim 3 including the step of using timestamps and a central arbiter to fairly arbitrate between input buffers in an input-buffered switch.

8. The method of claim 3 including the step of using timestamps and a central arbiter to fairly arbitrate between ports in an input-buffered switch.

9. The method of claim 3 including the step of using timestamps and a central arbiter to fairly arbitrate between virtual circuits in an input-buffered switch.

10. The apparatus of claim 1 wherein the scheduling control circuit pre-selects at each input buffer a respective virtual circuit for each output port.

11. The apparatus of claim 1 further comprising:

means for pre-selecting at each input buffer a respective virtual circuit for each output port; and means for performing request processing to send a respective timestamp associated with each pre-selected virtual circuit to the scheduling control circuit.

12. The apparatus of claim 1 further comprising:

an arbiter unit operating a FARR program to process the received cells.

13. The apparatus of claim 1 further comprising:

the scheduling control circuit which uses the timestamps to generate a matching of input buffers to output ports, wherein each unmatched output buffer is associated with a respective input buffer as an unmatched input buffer;

means for pre-selecting at each input buffer a virtual circuit for each output port;

means for performing request processing on at least one request to send a timestamp associated with each pre-selected virtual circuit to the scheduling control circuit;

means for granting, for each unmatched output port, the request having a minimum timestamp;

means for accepting, for each unmatched input buffer, the granted request with a minimum timestamp; and means for incorporating the accepted granted request in the matching.

14. The apparatus of claim 1 further comprising:

a central arbiter using the timestamps to fairly arbitrate between input buffers in an input-buffered switch.

15. The apparatus of claim 1 further comprising:

a central arbiter using the timestamps to fairly arbitrate between ports in an input-buffered switch.

16. The apparatus of claim 1 further comprising:

a central arbiter using the timestamps to fairly arbitrate between the virtual circuits in an input-buffered switch.

17. The apparatus of claim 2 wherein the scheduling control circuit pre-selects at each input buffer the virtual circuit for each output port.

18. The apparatus of claim 2 further comprising:

means for pre-selecting at each input buffer the virtual circuit for each output port; and means for performing request processing to send a respective timestamp associated with each pre-selected virtual circuit to the scheduling control circuit.

19. The apparatus of claim 2 further comprising:

an arbiter unit operating the FARR program to process the received cells.

20. The apparatus of claim 2 further comprising:

means for performing request processing on at least one request to send a timestamp associated with each circuit to the scheduling control circuit;

means for granting, for each unmatched output port, the request having a minimum timestamp;

means for accepting, for each unmatched input buffer, the granted request with a minimum timestamp; and means for incorporating the accepted granted request in the matching.

21. The apparatus of claim 2 further comprising:

a central arbiter using the timestamps to fairly arbitrate between input buffers in an input-buffered switch.

22. The apparatus of claim 2 further comprising:

a central arbiter using the timestamps to fairly arbitrate between ports in an input-buffered switch.

23. The apparatus of claim 2 further comprising:

a central arbiter using the timestamps to fairly arbitrate between the virtual circuits in an input-buffered switch.

* * * * *

UNITED STATES PATENT AND TRADEMARK OFFICE
CERTIFICATE OF CORRECTION

PATENT NO. : 5,517,495
DATED : May 14, 1996
INVENTOR(S) : Carsten Lund, Steven Phillips, Nicholas F. Reingold It is certified that error appears in the above-identified patent and that said Letters Patent is hereby corrected as shown below:

Column 11, claim 1, line 62, delete "associate" and insert --associated--.
Column 12, claim 2, line 9, delete "ad" and insert --and--.

Signed and Sealed this

Twenty-seventh Day of March, 2001

Attest:

NICHOLAS P. GODICI

Attesting Officer

Acting Director of the United States Patent and Trademark Office